(12) United States Patent
Barriga et al.

(10) Patent No.: US 10,313,116 B2
(45) Date of Patent: Jun. 4, 2019

(54) APPARATUSES AND A METHOD FOR PROTECTING A BOOTSTRAP MESSAGE IN A NETWORK

(71) Applicant: Telefonaktiebolaget LM Ericsson (publ), Stockholm (SE)

(72) Inventors: Luis Barriga, Bandhagen (SE); Per-Anders Dysenius, Karlshamn (SE); Magnus Lindström, Karlskrona (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 684 days.

(21) Appl. No.: 14/454,853

(22) Filed: Aug. 8, 2014

(65) Prior Publication Data
US 2014/0351575 A1 Nov. 27, 2014

Related U.S. Application Data

(63) Continuation of application No. 13/147,892, filed as application No. PCT/SE2009/051092 on Oct. 1, 2009, now Pat. No. 8,826,016.
(Continued)

(51) Int. Cl.
*H04L 9/08* (2006.01)
*H04L 29/06* (2006.01)
(Continued)

(52) U.S. Cl.
CPC .......... *H04L 9/0861* (2013.01); *H04L 9/0838* (2013.01); *H04L 41/0803* (2013.01);
(Continued)

(58) Field of Classification Search
CPC .................................................... H04L 9/0861
See application file for complete search history.

(56) References Cited

U.S. PATENT DOCUMENTS 7,628,322 B2  12/2009 Holtmanns et al.
7,835,528 B2  11/2010 Bajko et al.
(Continued)

FOREIGN PATENT DOCUMENTS

CN  101141792     3/2008
JP  2008547248 A  12/2008
(Continued)

OTHER PUBLICATIONS

3rd Generation Partnership Project, "Technical Specification Group Services and System Aspects; 3G Security; Security of Multimedia Broadcast/Multicast Service (MBMS) (Release 8)", Jun. 2008, pp. 1-66, 3GPP TS 33.246 V8.1.0.
(Continued)

*Primary Examiner* — John B King
*Assistant Examiner* — Carlos E Amorin
(74) *Attorney, Agent, or Firm* — Coats & Bennett, PLLC

(57) ABSTRACT

The embodiments of the present invention relate to apparatuses in the form of a first network unit and a device, and also relates to a method for enabling protection of a bootstrap message in a device management network system. The method comprises: receiving at the first network unit, a request to bootstrap the device; transmit a request for a bootstrap key, to a second network unit; receiving a message comprising the bootstrap key and further comprises trigger information and transmitting the trigger information to the device to trigger generation of the bootstrap key internally in the device. Thereafter a protected bootstrap message can be transmitted to the device from the first network unit, and when the device verifies and/or decrypts the bootstrap message, device management (DM) sessions can start between the device and the first network unit.

17 Claims, 6 Drawing Sheets

Related U.S. Application Data

(60) Provisional application No. 61/150,118, filed on Feb. 5, 2009.

(51) Int. Cl.
*H04W 12/12* (2009.01)
*H04W 12/04* (2009.01)
*H04L 12/24* (2006.01)

(52) U.S. Cl.
CPC .......... *H04L 63/061* (2013.01); *H04L 63/083* (2013.01); *H04L 63/1441* (2013.01); *H04W 12/04* (2013.01); *H04W 12/12* (2013.01); *H04L 2209/80* (2013.01)

(56) References Cited

U.S. PATENT DOCUMENTS

| | | | |
|---|---|---|---|
| 7,966,000 | B2 | 6/2011 | Semple et al. |
| 7,984,486 | B2 | 7/2011 | Vinayakray-Jani |
| 8,087,069 | B2 | 12/2011 | Bajko et al. |
| 8,213,905 | B2 * | 7/2012 | Yang ............ H04L 63/06 455/411 |
| 2006/0039561 | A1 * | 2/2006 | Ypya ............ H04L 41/0253 380/270 |
| 2006/0196931 | A1 | 9/2006 | Holtmanns et al. |
| 2007/0101122 | A1 * | 5/2007 | Guo ............ H04L 63/061 713/153 |
| 2007/0204160 | A1 | 8/2007 | Chan et al. |
| 2007/0234041 | A1 | 10/2007 | Lakshmeshwar et al. |
| 2008/0016230 | A1 | 1/2008 | Holtmanns et al. |
| 2008/0263346 | A1 * | 10/2008 | Hernandez ............ G06F 21/575 713/2 |
| 2008/0307518 | A1 | 12/2008 | Holtmanns et al. |
| 2009/0307474 | A1 * | 12/2009 | Johnston ............ G06F 21/572 713/2 |
| 2010/0174907 | A1 | 7/2010 | Semple et al. |
| 2010/0268937 | A1 | 10/2010 | Blom et al. |
| 2011/0010538 | A1 | 1/2011 | Falk et al. |
| 2011/0016321 | A1 | 1/2011 | Sundaram et al. |
| 2011/0126017 | A1 | 5/2011 | Blom et al. |
| 2011/0238972 | A1 | 9/2011 | Semple et al. |
| 2011/0264913 | A1 | 10/2011 | Nikander et al. |
| 2012/0166802 | A1 | 6/2012 | Blom et al. |

FOREIGN PATENT DOCUMENTS

| | | |
|---|---|---|
| JP | 2009512296 A | 3/2009 |
| WO | 2007063420 A2 | 6/2007 |
| WO | 2009004590 A2 | 1/2009 |

OTHER PUBLICATIONS

Open Mobile Alliance, "OMA Device Management Security" Draft Version 1.3—Jul. 6, 2009, pp. 1-30.

3rd Generation Partnership Project, "Technical Specification Group Services and System Aspects; Generic Authentication Architecture (GAA); Generic bootstrapping architecture (Release 8)", Sep. 2008, pp. 1-75, 3GPP TS 33.220 V8.4.0.

3rd Generation Partnership Project, "Technical Specification Group Services and System Aspects; Generic Authentication Architecture (GAA); Generic Bootstrapping Architecture (GBA) Push Layer (Release 8)", Apr. 2008, pp. 1-16, 3GPP TS 33.224 V0.1.0.

3rd Generation Partnership Project, "Technical Specification Group Services and System Aspects; Generic Authentication Architecture (GAA); Generic Bootstrapping Architecture (GBA) Push function (Release 8)", Dec. 2008, pp. 1-23, 3GPP TS 33.223 V8.2.0.

Abid, M., et al., "Efficient Identity-Based Authentication for IMS based Services Access", MoMM 2009 Short Papers, Proceedings of MoMMZOOQ, Dec. 14-16, 2009, pp. 260-266.

GBA Around Push And Bootstrap and NAF Google Search, Feb. 8, 2013, pp. 1-2

Open Mobile Alliance, "OMA Device Management Bootstrap", Candidate Version 1.2—Dec. 16, 2005, pp. 1-27.

\* cited by examiner

APPARATUSES AND A METHOD FOR PROTECTING A BOOTSTRAP MESSAGE IN A NETWORK

RELATED APPLICATIONS

The present application is a continuation of U.S. patent application Ser. No. 13/147,892, which was filed on Aug. 4, 2011, which is a national stage application of PCT/SE2009/051092, filed Oct. 1, 2009, and claims benefit of U.S. Provisional Application 61/150,118, filed Feb. 5, 2009, the disclosures of each of which are incorporated herein by reference in their entirety.

TECHNICAL FIELD

The present invention relates generally to the field of mobile or wireless communications network systems, and, more specifically, to apparatuses and a method for securely protecting a bootstrap message during the bootstrapping of a device in a device management network system.

BACKGROUND

Mobile devices need to be configured with various settings to control and to provide various functions and support various services. One known method of configuration of mobile devices with service related data is via, for example, short message service (SMS) or wireless application protocol (WAP). This is a unidirectional path and to be able to perform bidirectional service, open mobile alliance (OMA) has specified protocols, data models and policies for device management (DM). As an example, OMA DM version 1.2.1 enabler release specifications define how a DM session is established and maintained. One of the important functions in these specifications includes a bootstrap specification that describes methods for a device to be provisioned with OMA DM settings prior to initiating a management session. The OMA DM bootstrap technical specifications are described in *OMA DM Bootstrap version 1.2., OMA-TS-DM_Bootstrap V1_2_1. Open Mobile Alliance*, June 2008.

Bootstrap is a process of provisioning a DM client of a mobile or a wireless device, to move the device from an un-provisioned, empty state, to a state where it is able to initiate a management session to a DM server and later to e.g. new DM servers. There are three different ways to perform a bootstrap process: customized bootstrap; server initiated bootstrap and bootstrap from a smartcard.

In the customized bootstrap process, devices are loaded with OMA DM bootstrap information at manufacture. This is also referred to as factory bootstrap.

In the server initiated bootstrap process, a server is configured to send out bootstrap information via some push mechanism e.g. WAP push. For this process, the server must receive the device address/phone number beforehand.

In the bootstrap process from the smartcard, the smartcard (e.g. subscriber identity module (SIM) or universal SIM (USIM)) is inserted in the device and the DM client is bootstrapped from the smartcard.

There are, however, several problems and drawbacks associated with systems using these processes. The customized bootstrap process requires that the basic parameters are known at the time of manufacture or at the time of selling the device. The server initiated bootstrap process specifies that the international mobile subscriber identity (IMSI) must be used to encode the basic DM parameters when the DM server performs a bootstrap over the air interface. This is done by sending an encrypted SMS with the basic parameters to the device. The key used for encryption is the IMSI for e.g. second generation/third generation network system, or the electronic serial number (ESN) for code division multiple access (CDMA) system. The IMSI or the ESN have however not been designed to be secret. This also means that the bootstrap message to be transmitted from the DM server to the device is weakly protected. As a result, an attacker can create its own bootstrap message in order to bootstrap a device that would be locked to a malicious DM server. Another drawback is that an attacker can eavesdrop the bootstrap message that is only integrity protected. Since the bootstrap message may contain credentials such as username and password, the attacker can impersonate the device.

FIG. 1 illustrated a high level view of a server initiated bootstrap process, as defined in the above cited specifications *OMA DM Bootstrap version 1.2.1, OMA-TS-DM_Bootstrap V1_2_1*. The scenario of FIG. 1 describing the service initiated bootstrap, shows a device 10, a user 11, a network 12 and a DM server (DMS) 13. In *OMA-TS-DM_Bootstrap V1_2_1*, it is described that once the user 11 acquires the device 10 and personalizes it, e.g. by inserting a SIM, the prerequisites for the bootstrapping process are in place. The DMS 13 is notified or informed of the identity, address or phone number of the device 10 by e.g. the network 12 the first time the device 10 registers to the network 12. When this happens a request to bootstrap the device 10 can be sent from the (core) network 12 to the DMS 13 with the number used by the device 10. The DMS 13 is now in a position where it can send out an OMA DM bootstrap message. This bootstrap message contains information for the device 10 to be able to initiate a management session with DMS 13 that sent out the bootstrap message.

The weak protection of the bootstrapping scenario described above, stems from the fact that the bootstrap message are, as mentioned above, only protected with a non-secret key (IMSI or ESN) as indicated in section 5.7.2.3.1 in *OMA Device Management Security 1.2.1, OMA-TS-DM Security-V1_2_1, OMA*, 2008. Thus neither IMSI nor ESN is considered a shared secret from security standpoint. Similar OMA specifications also suffer from the same surety weaknesses, such as *Enable Release Definition for OMA Client Provisioning Specifications version 1.2. OMA-ERELD-ClientProvisioning-V1_1*; and Provisioning Bootstrap 1.1. *OMA-WAP-ProvBoot*-V1_1.

It should be mentioned that these security vulnerabilities are the reasons why the security group (SA3) in the 3$^{rd}$ generation partnership project (3GPP) has issued a strong recommendation to not use the server initiated bootstrap method/process as indicated in 3GPP LS reply S3-080262.

Another prior art disclosed in US patent application US 2008/0155071 proposes a method and a system for bootstrap of a device in a communications network. In this prior art, a server initiated bootstrapping is used to first provision a smartcard of a device using over the air (OTA) technology so that the device can bootstrap from the smartcard. This is performed by combining bootstrap through the smartcard with the 3GPP automatic device detection (ADD) function. The 3GPP ADD, which is defined in the technical specification 3GPP TS 22.101, enables automatic detection of a device when the device appears in the network. However, the method of this prior art still relies on the lack of security of the current OMA DM specified Server Initiated bootstrap as described earlier.

SUMMARY

It is thus an object of the exemplary embodiments of the present invention to address the above mentioned problems and to provide apparatuses and a method that allow secure and protected transmission of bootstrap messages from a DM server to a device thereby preventing eavesdroppers and/or attackers to impersonate the device and/or to hijack the device.

According to a first aspect of exemplary embodiments of the present invention, the above stated problems are solved by means of a first network unit of a DM network system, for enabling protection of a bootstrap message. The first network unit comprises a receiver configured to receive a first message comprising a request to bootstrap a device, the message comprising information identifying the device and information identifying a subscriber. The first network unit further comprises a transmitter configured to send a second message comprising the information identifying the subscriber, to a second network unit, the second message requesting the second network unit to provide the first network unit with a bootstrap key that is based on the information identifying the subscriber. The receiver is further configured to receive from the second network unit, a third message comprising the bootstrap key to be used for protection of the bootstrap message. The third message also comprises trigger information which is transmitted to the device to trigger generation of the bootstrap key in the device.

As the trigger information is received from the first network unit, the device generates internally the bootstrap key. When both the first network unit and the device are in possession of the bootstrap key, the first network unit protects, based on the bootstrap key, the bootstrap message and transmits the protected bootstrap message to the device. This way, an attacker cannot hijack or impersonate the device since the secret bootstrap key is known only to the DM network and to the device.

According to another aspect of exemplary embodiments of the present invention, the above stated problems are solved by means of a method in a first network unit of a DM network, for enabling protection of a bootstrap message. The method comprising: receiving a first message comprising a request to bootstrap a device, the first message comprising information identifying the device and a subscriber. The method further comprises, transmitting a second message comprising the information identifying the subscriber to a second network unit, requesting the second network unit to provide the first network unit with a bootstrap key that is based on the information identifying the subscriber. The method further comprises, receiving from the second network unit a third message comprising the bootstrap key, for enabling protection of the bootstrap message, the third message further comprising trigger information. The method further comprises, transmitting the trigger information to the device in order to trigger generation of the bootstrap key in the device.

According to yet another aspect of the exemplary embodiments of the present invention, the above stated problems are solved by means of a device capable in communicating with a first network unit of a DM network system for enabling protection of a bootstrap message. The device comprises means for notifying the first network unit of information identifying the device and a subscriber. The device further comprises a receiver configured to receive from the first network unit, trigger information to trigger generation of the bootstrap key in the device. The receiver is further configured to receive a protected bootstrap message protected based on the bootstrap key, and the device comprises means for verifying and/or decrypting the protected bootstrap message.

An advantage of the exemplary embodiments of the present invention is to prevent attackers from hijacking a device and/or impersonate the device.

Another advantage of the exemplary embodiments of the present invention is to make sure to use a truly secret bootstrap key that is known only to the network and the device.

Still other advantages, objects and features of the embodiments of the present invention will become apparent from the following detailed description in conjunction with the accompanying drawings, attention to be called to the fact, however, that the following drawings are illustrative only, and that various modifications and changes may be made in the specific embodiments illustrated as described within the scope of the appended claims. It should further be understood that the drawings are not necessarily drawn to scale and that, unless otherwise indicated, they are merely intended to conceptually illustrate the structures and procedures described herein.

DETAILED DESCRIPTION

In the following description, for purposes of explanation and not limitation, specific details are set forth such as particular architectures, scenarios, techniques, etc. in order to provide thorough understanding of the present invention. However, it will be apparent from the following that the present invention and its embodiments may be practiced in other embodiments that depart from these specific details.

The exemplary embodiments of the present invention are described herein by way of reference to particular example scenarios. In particular the invention is described in a non-limiting general context in relation to server initiated bootstrap scenario in a device management (DM) network system comprising DM server (DMS) interacting with a generic bootstrapping architecture (GBA) according to GBA push specifications in the 3GPP technical specifications TS 33.223. The DMS is hereinafter denoted a first network unit. Note however that the first network unit may be any suitable network unit or node capable in implementing the exemplary embodiments of the present invention. Such a network unit can e.g. be represented by a DM proxy instead of a DMS.

Figure 1:
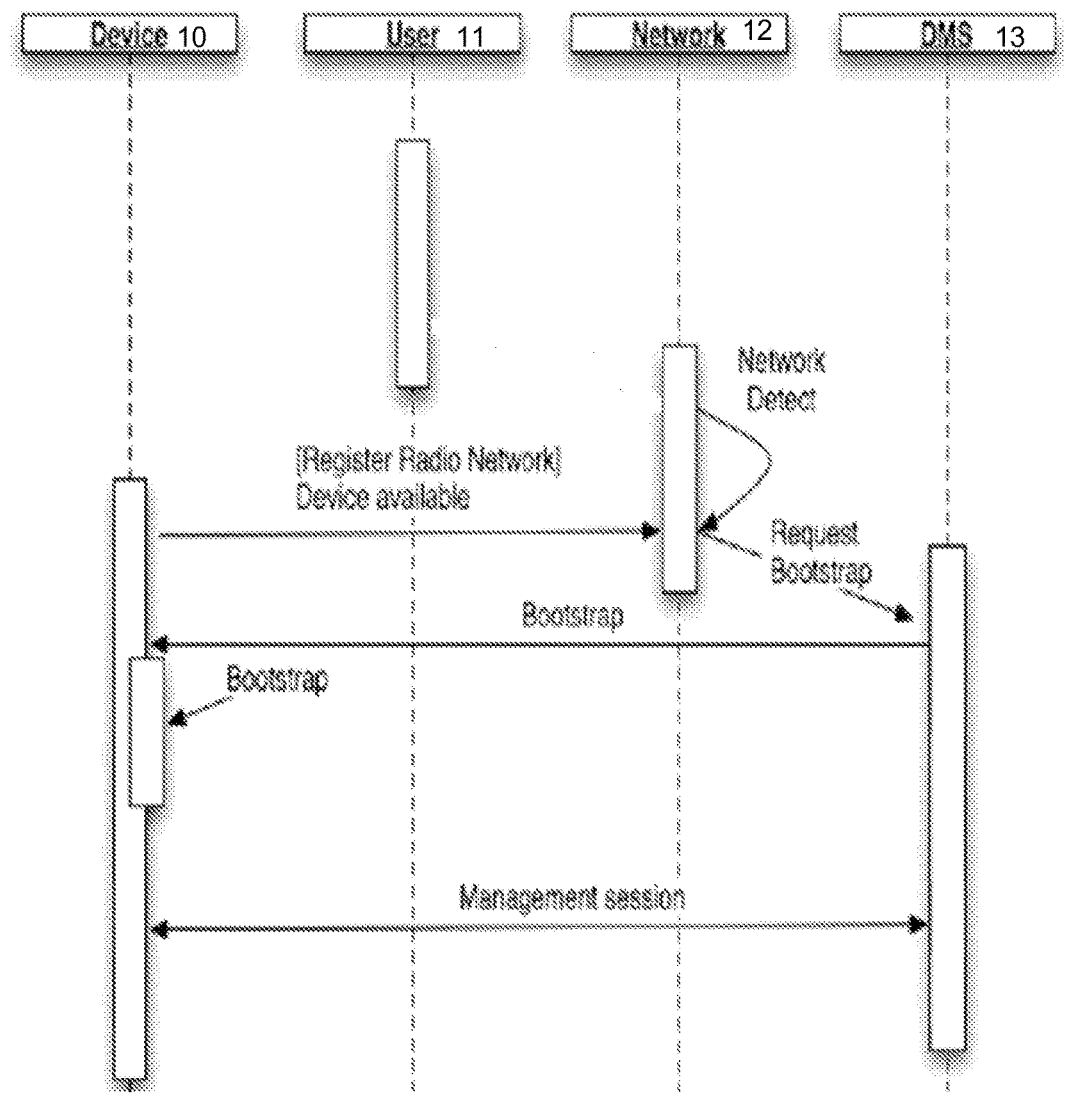
FIG. 1 is a prior art high level view of signalling involved during a server initiated bootstrap procedure.
Figure 2:
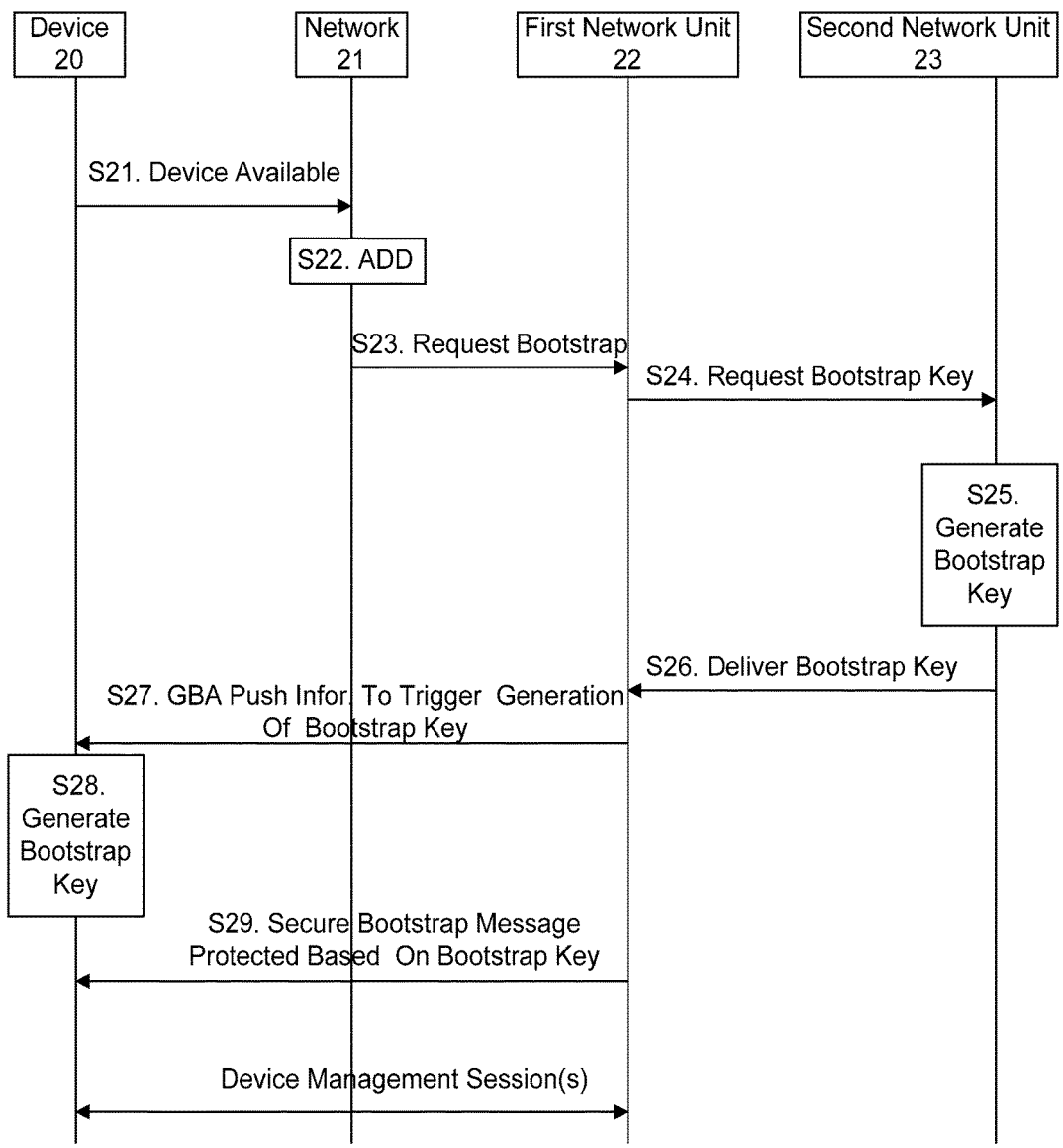
FIG. 2 is a flow diagram for enabling secure server initiated bootstrapping of a device according to an exemplary embodiment of the present invention.

Referring to FIG. 2 there is illustrated a flow diagram for enabling secure server initiated bootstrapping of a device in a network system, in accordance with an exemplary embodiment of the present invention. The entities that are shown are: the device 20, a network entity (or entities) 21 (e.g. a home location register), a first network unit 22 and a second network unit 23. As will be illustrated and described later, additional nodes/functions can also be used for the purpose of secure bootstrapping of a device.

As shown in FIG. 2, the device 20 notifies the network 21 of its availability (S21). This can be done by the user/subscriber turning on the device 20 attempting to attach to the network 21. Via e.g. known automatic device detection (ADD) methods, as disclosed in 3GPP TS 22.101, or known user-initiated procedures as described in GBA Push 3GPP TS 33.223, the network 21 detects the presence/availability of the device 20 (S22). Upon attachment to the network 21, the device 20 sends information identifying the device i.e. its device identity e.g. IMEI and also sends information identifying the subscriber e.g. IMSI/ESN. In bootstrap request (S23) the network 21 requests the first network unit 22 to bootstrap the device 20. In the bootstrap request (S23), the network 21 (e.g. HLR) includes the information identifying the device (IMEI) and the information identifying the subscriber i.e. IMSI/ESN, MSISDN etc. When the first network unit 22 receives the request, and based on the information identifying the device and user/subscriber, the first network unit 22 determines if GBA PUSH can be used towards the device. If so, the first network unit 22 transmits a message (S24) to the second network unit 23 requesting the second network unit 23 to provide the first network unit 22 with a bootstrap key. The second network unit 23 which is part of the GBA subsystem comprises a bootstrapping server function (BSF) and a home subscriber server (HSS).

It should be mentioned that if the first network unit 22 determined that GBA PUSH can be used towards the device, a network application function (NAF) of the first network unit 22 is configured to contact the BSF using GBA PUSH procedures to request, using message (S24), at least a trigger information and a bootstrap key. The trigger information corresponds to GBA PUSH information (GPI). Message (S24) also comprises the NAF identity. Note however that the first network unit 22 is configured to select a method for bootstrapping the device 20, being then GBA PUSH based one of the secure ones. Should GBA PUSH be selected, based on information identifying the device and the subscriber, then NAF of the first network unit 22 handles the secure bootstrapping process. In the following it is described the case when GBA PUSH can be used towards the device 20 i.e. request message (S24) reaches the second network unit 23.

Referring back to FIG. 2, when the second network unit 23 receives the request message (S24), it generates the bootstrap key (S25) and sends or delivers the bootstrap key and at least the GPI to the first network unit (22) in a response message (S26) denoted here GPI response. Now that the first network unit 22 is in possession of the GPI response, it transmits or forwards the trigger information i.e. the GPI part in the GPI response to the device 20 (S27). The first network unit 22 can also store the bootstrap key prior to transmitting the GPI to the device 20. The GPI or trigger information can be transmitted over SMS, WAP, HTTP, SIP push or any bearer suitable for conveying the trigger information to trigger the generation of the bootstrap key in the device 20. Upon reception of the GPI, the device 20 generates the bootstrap key (S28) using suitable standard procedures.

In GBA Push 3GPP TS 33.223, it is disclosed that the GPI is protected. This is known as GPI integrity protection and GPI confidentiality protection. And that in GBA the bootstrap key is denoted Ks_NAF and this key is also known as key material or keying material. Ks_NAF is described in 3GPP TS 33.220 V8.5.0 which is referred to in the above mentioned prior art GBA Push 3GPP TS 33.223. Throughout the description, a bootstrap key is used to mean Ks_NAF or key/keying material.

Referring back to FIG. 2, when the device 20 generates the bootstrap key (S28) it stores the bootstrap key. Subsequently, a secure bootstrapping can be performed by the first network unit 22 by protecting and transmitting a bootstrap message which is protected based on the bootstrap key (S29). The first network unit 22 can directly protect the bootstrap message using the bootstrap key or can derive further keys using the bootstrap key and use these keys to protect the bootstrap message. Note that if the first network unit 22 has encrypted the bootstrap message prior to transmitting it to the device 20, the device 20 needs to first decrypt the bootstrap message and then verify the message. The bootstrap key can instead of IMSI/ESN, be used for integrity protection and/or can be used for confidentiality protection.

After successful and secure bootstrapping of the device, DM sessions can start between the device 20 and the first network unit 22. Note that the bootstrap key can also be used as a master key to further generate keys that can be used to protect one or more DM sessions between the device 20 and the first network unit 22 e.g. authentication, after successful verification/decryption of the bootstrap message.

Figure 3:
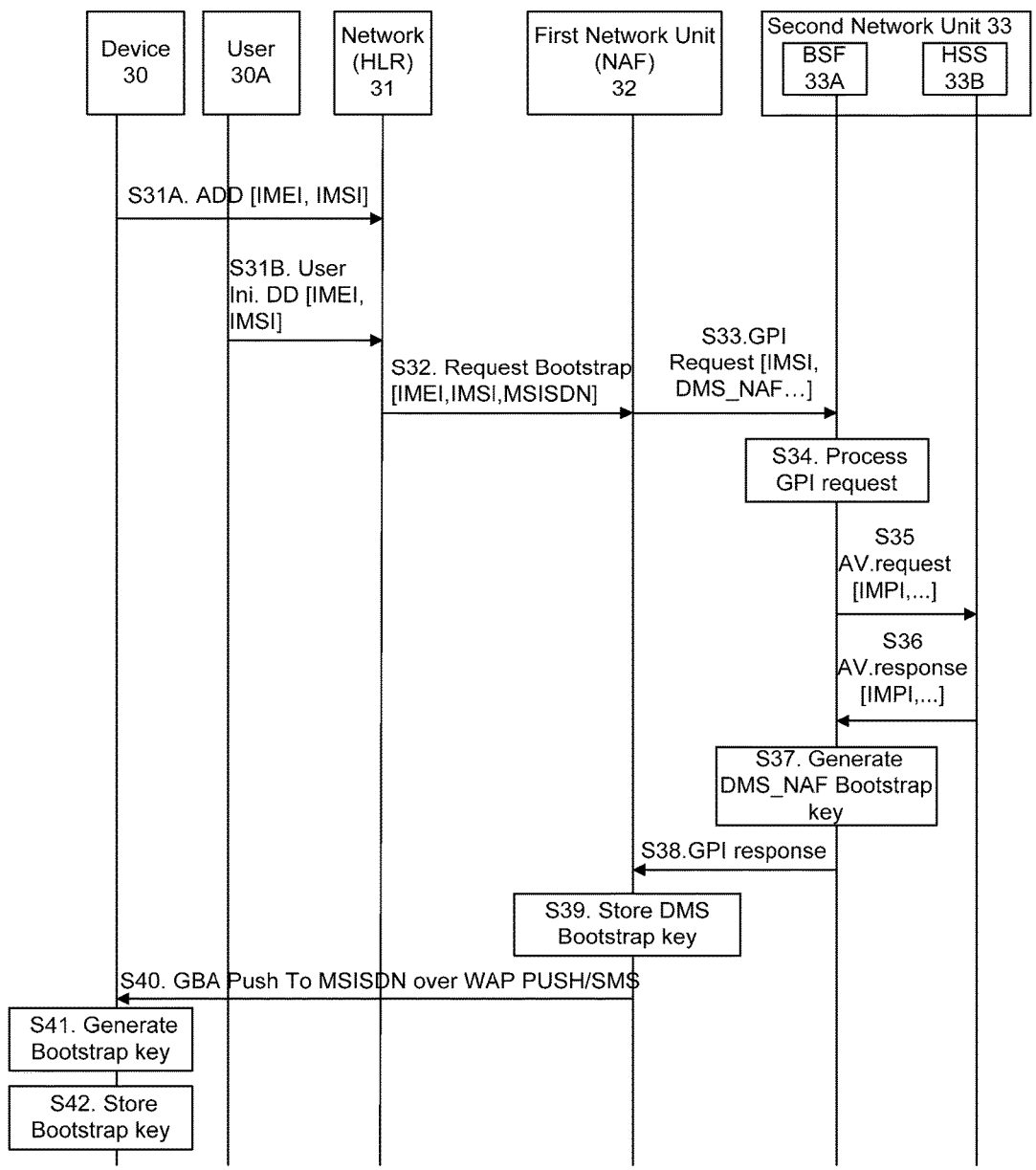
FIG. 3 is another flow diagram for secure server initiated bootstrapping of a device according to another exemplary embodiment of the present invention

Referring to FIG. 3, there is illustrated a flow diagram for enabling secure server initiated bootstrapping of a device in a network system, in accordance with another exemplary embodiment of the present invention. Similarly to FIG. 2, the network system comprises a device 30, a network 31 (e.g. HLR), a first network unit 32 (e.g. DMS with a NAF) and a second network unit 33 comprising a BSF 33A and a HSS 33B. FIG. 3 also depicts a user 30A. In (S31A), upon attachment to the network 31, the device 30 sends information identifying the device, IMEI, and also sends information identifying the user/subscriber (e.g. IMSI). As mentioned earlier, this can be done using some form of ADD procedure and/or user initiated procedure. It should be mentioned that a user/subscriber 30A can alternatively notify the network 31 about the IMEI and IMSI (S31B). This can be performed by a seller at a point of sale consoles or by the end-user himself via a web interface or using e.g. DMTF tones.

In (S32), when the network 31 has detected the device/user/subscriber identified by e.g. IMSI/ESN, MSISDN and IMEI, the network 31 sends a request to bootstrap the device 30, to the first network unit 32 (e.g. DMS (NAF)) and includes in the request IMEI, IMSI (or ESN) and MSISDN. As mentioned earlier, the first network unit 32 or the NAF of the first network unit 32 first determines based on the device and user/subscriber information if GBA PUSH can be used towards the device 30. If so, the NAF part of the first network unit 32 sends a GPI request (S33) using GBA PUSH procedures, to the BSF 33A of the second network unit 33, to request a GPI response. The request (S33) comprises information identifying the subscriber e.g. IMSI and at least the identity of the NAF (DMS_NAS_Id). When the BSF 33A receives the request it processes the request (S34) and identifies the user/subscriber. Thereafter, the BSF 33A sends a request (S35) to the HSS 33B of the second network unit 33, requesting the HSS 33B of an authentication vector (AV) for the device 30. In the AV request (S35), the IMPI is indicated. In (S36) the HSS 33B returns the requested AV in an AV response. The BSF 33A then generates (S37) a bootstrap key which is a DMS NAF bootstrap key and stores the key The BSF 33A sends in (S38) a GPI response comprising the bootstrap key and at least a GPI comprising GPI parameters, to the first network unit 32. The first network unit 32 stores the bootstrap key (S39) and prepares a GPI package comprising the trigger information (i.e. GPI) prior to sending the GPI package to the device 30 (S40). As mentioned earlier any suitable bearer can be used to convey the GPI to the device 30 e.g. GPI over WAP PUSH or SMS or SIP etc. The MSISDN can be used to address the device 30.

When the device 30 receives the GPI, the device 30 generates internally the DMS NAF bootstrap key (S41) and the device 30 stores the bootstrap key (S42). Thereafter a bootstrap message is protected by the first network unit 32 based on the bootstrap key, and transmits the protected bootstrap message to the device 30 (not shown). The device then verifies and/or decrypts the bootstrap message. If verification and/or decryption is successful DM sessions begin between the device and the first network unit (not shown). This way only the first network unit and the device are aware of the bootstrap key thereby preventing eavesdroppers and attackers to hijack the device or to impersonate the device.

Similarly to the previously described exemplary embodiment, both the first network unit and the device can use the bootstrap key to generate further keys. The first network unit uses the further keys to protect the bootstrap message and the device can use the further keys to verify and/or decrypt the bootstrap message.

Figure 4:
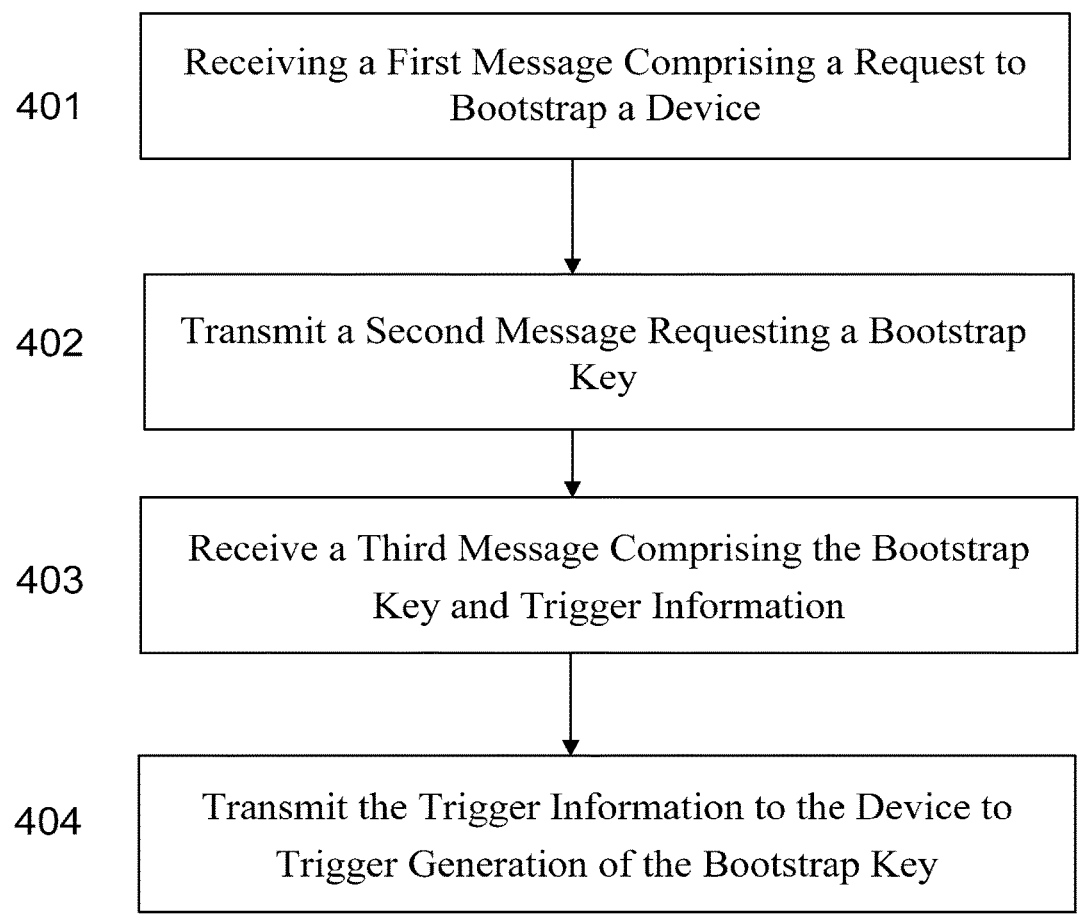
FIG. 4 is a diagram illustrating a flowchart of a method for use in a first network unit according to exemplary embodiments of the present invention.

Referring to FIG. 4 there is illustrated the main steps of the method or procedure, in a first network unit, for enabling protection of a bootstrap message in accordance with the previously described exemplary embodiments of the present invention. As shown in FIG. 4, the main steps of the method comprise:

(401) receiving, a first message (i.e. a request to bootstrap a device) comprising information identifying the device and information identifying a subscriber;

(402) transmitting a second message (i.e. a GPI request) comprising the information identifying the subscriber, to a second network unit, requesting the second network unit to provide the first network unit with a bootstrap key that is based on the information identifying the subscriber;

(403) receiving, from the second network unit, a third message (i.e. GPI response) comprising the bootstrap key and a trigger information (i.e. GPI), for enabling protection of the bootstrap message;

(404) transmitting the trigger information to the device to trigger generation of the bootstrap key internally in the device.

Additional method steps and functions of the first network unit have already been discussed and are therefore not repeated.

Figure 5:
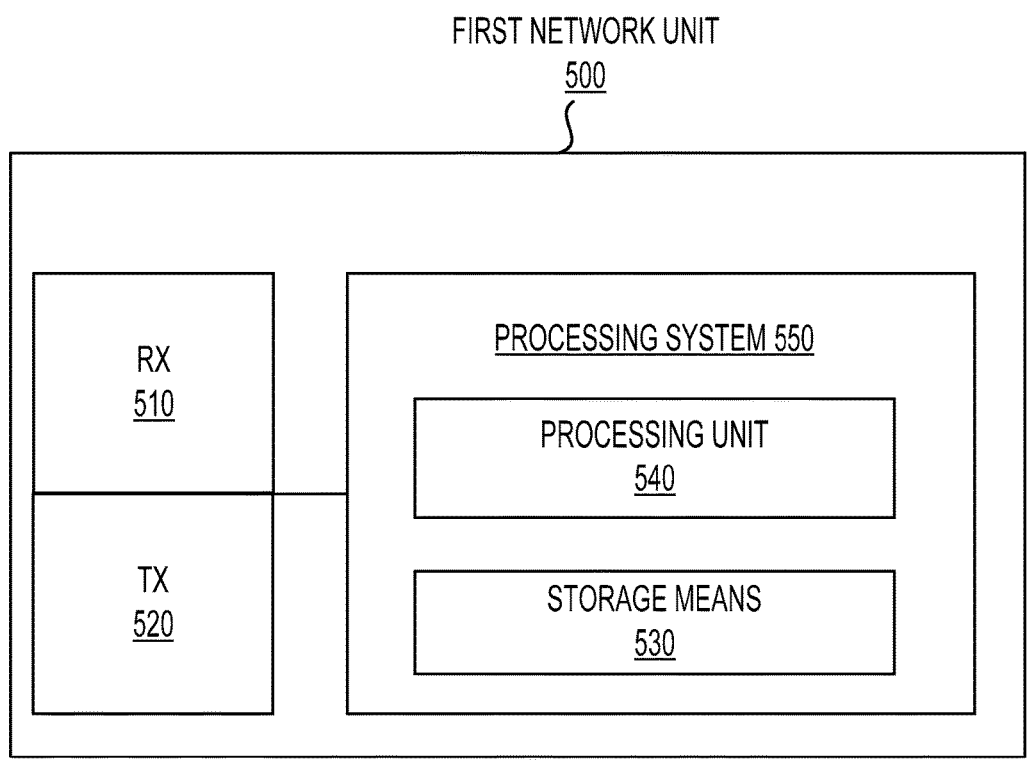
FIG. 5 illustrates a block diagram of an exemplary network unit according to exemplary embodiments of the present invention.

Referring to FIG. 5 there is illustrated a block diagram of an exemplary first network unit 500, e.g., a DMS, of a DM network system, for enabling protection of a bootstrap message, in accordance with previously described exemplary embodiments of the present invention. As shown in FIG. 5, the first network unit 500 comprises a receiver 510 (RX) configured to receive a first message comprising a request to bootstrap a device. The first message comprises information identifying the device and the subscriber. The first network unit 500 further comprises a transmitter 520 (TX) configured to transmit a second message (i.e. GPI request) comprising the information identifying the subscriber, to a second network unit (e.g. BSF+HSS), requesting the second network unit to provide it with the bootstrap key. The receiver 510 of the first network unit 500 is further configured to receive a third message (i.e. GPI response) comprising the bootstrap key for enabling protection of the bootstrap message. The third message further comprises a trigger information (i.e. GPI). The transmitter 520 of the first network unit 500 is further configured to transmit the trigger information to the device to trigger generation of the bootstrap key in the device. The first network unit 500 further comprises storage means 530 for storing the bootstrap key. The first network unit 500 further comprises a processing logic/unit 540 configured to determine if GBA PUSH can be used towards the device and is further configured to generate further/additional keys based on the bootstrap key, and to protect the bootstrap message. The storage means 530 and the processing logic/unit 540 are shown as being part of a processing system 550, although this is not necessary.

Although FIG. 5 shows exemplary components of the first network unit 500, in other implementations, the first network unit 500 may contain fewer, different, or additional components than depicted in FIG. 5. In still other implementations, one or more components of unit 500 may perform the tasks described as being performed by one or more other components of the first network unit 500.

Figure 6:
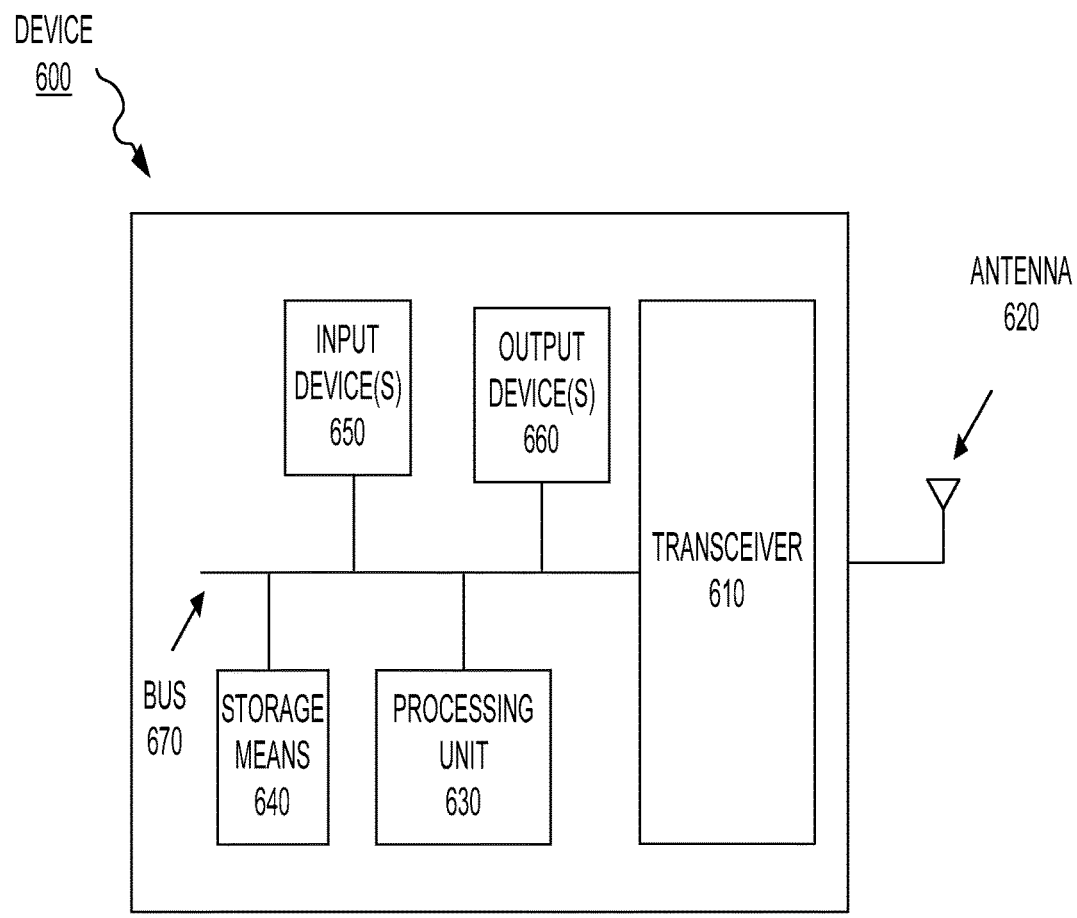
FIG. 6 illustrates a block diagram of an exemplary device according to exemplary embodiments of the present invention.

Referring to FIG. 6 there is illustrated a diagram of exemplary components of device 600 in accordance with some exemplary embodiments of the present invention. As illustrated, the device 600 comprises a transceiver 610 comprising means for notifying a first network unit (of FIG. 5) of the DM network system of information identifying the device and the subscriber for enabling protection of a bootstrap message. The means for notifying can be viewed as a transmitter of the transceiver 610. The transceiver 610 further comprises a receiver configured to receive from the first network unit trigger information (i.e. GPI) to trigger generation of a bootstrap key internally in the device. The receiver of the transceiver 610 is further configured to receive a protected bootstrap message which the first network unit protected based on the bootstrap key. An antenna 620 is also shown connected to the transceiver 610. The device 600 further comprises means for verifying and/or decrypting the protected bootstrap message. Processing unit/means 630 of the device 600 is configured to generate the bootstrap key and to perform the verification/decryption of the protected bootstrap message. The device 600 may include several antennas (only one antenna 620 is shown) a memory or storage means 640 for storing the bootstrap key, an input device(s) 650, an output device(s) 660, and a bus 670. Although FIG. 6 shows exemplary components of device 600, in other implementations, device 600 may contain fewer, different, or additional components than depicted in FIG. 6.

The present invention and its exemplary embodiments can be realized in many ways. For example, one embodiment of the present invention includes a computer-readable medium having program instructions stored thereon that are executable by a computer of the first network unit to perform the method steps of the exemplary embodiments of the present invention as previously described.

While the invention has been described in terms of several preferred embodiments, it is contemplated that alternatives, modifications, permutations and equivalents thereof will become apparent to those skilled in the art upon reading of the specifications and upon study of the drawings. It is therefore intended that the following appended claims include such alternatives, modifications, permutations and equivalents as fall within the scope of the present invention.

The invention claimed is:

1. A node implementing a network application function for enabling protection of a bootstrap message, the node comprising:
one or more processing circuits and a memory, the memory containing instructions executable by the one or more processing circuits whereby the network application function is configured to:
receive an identifier of a device that is to be bootstrapped and an identifier of a subscriber associated with said device;
send to a bootstrapping server function a request for a bootstrap key that is associated with the identifier for said subscriber and that will protect a bootstrap message to be sent to the device to provision the device with the ability to initiate a management session with a device management (DM) network system over an IP connection, wherein said management session configures the device with settings that the device requires in order for the device to support one or more services, wherein the request for the bootstrap key also requests trigger information that will trigger the device itself to generate the bootstrap key;
receive the requested bootstrap key and the trigger information from the bootstrapping server function; and
send the trigger information to the device to bootstrap the device;
wherein the bootstrap message comprises service setting parameters, a username and a password, and the bootstrap message is further protected by encrypting the bootstrap message with the bootstrap key, wherein the username and password are used to authenticate with the DM network system.

2. The node of claim 1, wherein the service setting parameters include parameters that configure the device to accept management commands from the DM network system during the management session.

3. The node of claim 1, wherein the service setting parameters include parameters that provision the device with capability for General Packet Radio Service (GPRS).

4. The node of claim 1, wherein the trigger information comprises GBA PUSH information (GPI), and wherein the request for the bootstrap key and the trigger information comprises a GPI request message.

5. The node of claim 1, wherein said settings with which the device is configured during the management session include settings for at least one of an email service and a Multimedia Messaging Service (MMS).

6. A server comprising:
one or more processing circuits and a memory, the memory containing instructions executable by the one or more processing circuits whereby the server is configured to:
receive a request to bootstrap a device that includes an identifier of the device and an identifier of a subscriber associated with the device;
obtain from a bootstrapping server function a bootstrap key that is associated with the identifier for said subscriber and that will protect a bootstrap message to be sent to the device to provision the device with the ability to initiate a management session with a device management (DM) network system over an IP connection, wherein said management session configures the device with settings that the device requires in order for the device to support one or more services;
obtain from a bootstrapping server function trigger information that will trigger the device itself to generate the bootstrap key; and
send the trigger information to the device as a response to the request to bootstrap the device;
wherein the bootstrap message comprises service setting parameters, a username and a password, and the bootstrap message is further protected by encrypting the bootstrap message with the bootstrap key, wherein the username and password are used to authenticate with the DM network system.

7. The server of claim 6, wherein the memory contains instructions executable by the one or more processing circuits whereby the server is further configured to send the encrypted bootstrap message to the device.

8. The server of claim 7, wherein the trigger information is sent to the device in a generic bootstrapping architecture push information message.

9. The server of claim 6, wherein the server setting parameters include parameters that configure the device to accept management commands from the DM network system during the management session.

10. The server of claim 6, wherein the server setting parameters include parameters that provision the device with capability for General Packet Radio Service (GPRS).

11. The server of claim 6, wherein the trigger information comprises GBA PUSH information (GPI).

12. The server of claim 6, wherein said settings with which the device is configured during the management session include settings for at least one of an email service and a Multimedia Messaging Service (MMS).

13. A device comprising:
one or more processing circuits and a memory, the memory containing instructions executable by the one or more processing circuits whereby the device is configured to:
send an identifier of the device and an identifier of a subscriber associated with the device to a server;
after sending said identifiers, receive trigger information from the server;
wherein the server sends a request for the trigger information and a bootstrap key to a bootstrapping server function and in response to sending the request receives the trigger information and the bootstrap key from the bootstrapping server function;
generate itself the bootstrap key responsive to said trigger information;
receive from the server a protected bootstrap message that includes parameters provisioning the device with the ability to initiate a management session with a device management (DM) network system over an IP connection;
verify, decrypt, or both verify and decrypt the protected bootstrap message using the device-generated bootstrap key; and
initiate said management session with the DM network system, the management session configuring the device with settings that the device requires in order for the device to support one or more services;
wherein the bootstrap message comprises service setting parameters, a username and a password, and the bootstrap message is further protected by encrypting the bootstrap message with the bootstrap key, wherein the username and password are used to authenticate with the DM network system.

14. The device of claim 13, wherein the trigger information is received in a generic bootstrapping architecture push information message.

15. The device of claim 13, wherein the trigger information comprises GBA PUSH information (GPI).

16. The device of claim 13, wherein the service setting parameters include parameters that provision the device with capability for General Packet Radio Service (GPRS).

17. The device of claim 13, wherein said settings with which the device is configured during the management session include settings for at least one of an email service and a Multimedia Messaging Service (MMS).

* * * * *

UNITED STATES PATENT AND TRADEMARK OFFICE
CERTIFICATE OF CORRECTION

PATENT NO. : 10,313,116 B2
APPLICATION NO. : 14/454853
DATED : June 4, 2019
INVENTOR(S) : Barriga et al.

Page 1 of 1

It is certified that error appears in the above-identified patent and that said Letters Patent is hereby corrected as shown below:

In the Specification

In Column 1, Line 9, delete "2011," and insert -- 2011, now Pat. No. 8,826,016, --, therefor.

In Column 2, Line 37, delete "TS-DM Security-V1_2_1," and insert -- TS-DM_ Security-V1_2_1, --, therefor.

Signed and Sealed this
Twenty-fourth Day of December, 2019

Andrei Iancu
*Director of the United States Patent and Trademark Office*